United States Patent
Fieldman

(10) Patent No.: US 12,554,925 B2
(45) Date of Patent: Feb. 17, 2026

(54) SYSTEMS AND METHODS FOR CONNECTED NATURAL LANGUAGE MODELS

(71) Applicant: CurioXR, Inc., Gainesville, FL (US)

(72) Inventor: Ethan Fieldman, Gainesville, FL (US)

(73) Assignee: CurioXR, Inc., Gainesville, FL (US)

( * ) Notice: Subject to any disclaimer, the term of this patent is extended or adjusted under 35 U.S.C. 154(b) by 0 days.

(21) Appl. No.: 19/090,552

(22) Filed: Mar. 26, 2025

(65) Prior Publication Data

US 2025/0371264 A1 Dec. 4, 2025

Related U.S. Application Data

(63) Continuation of application No. 18/733,031, filed on Jun. 4, 2024, now Pat. No. 12,265,788.

(51) Int. Cl.
*G06F 40/20* (2020.01)
*G06F 21/62* (2013.01)

(52) U.S. Cl.
CPC .......... *G06F 40/20* (2020.01); *G06F 21/6218* (2013.01)

(58) Field of Classification Search
CPC ...... G06F 40/20; G06F 21/6218; G06F 40/40; G10L 15/18; G10L 15/22; G10L 2015/223
See application file for complete search history.

(56) References Cited

U.S. PATENT DOCUMENTS

| | | |
|---|---|---|
| 10,157,609 B2 | 12/2018 | Plumpe |
| 11,721,347 B1 | 8/2023 | Pasko |
| 11,922,144 B1 | 3/2024 | Mishchenko |
| 12,050,714 B2 | 7/2024 | Griffin |
| 12,493,791 B2 | 12/2025 | Song et al. |
| 2014/0365218 A1 | 12/2014 | Chang |
| 2015/0120288 A1 | 4/2015 | Thomson |
| 2016/0379626 A1 | 12/2016 | Deisher |
| 2021/0074285 A1 | 3/2021 | Golikov |
| 2022/0328039 A1 | 10/2022 | Avijeet |
| 2023/0059367 A1 | 2/2023 | Lai |
| 2023/0074406 A1 | 3/2023 | Baeuml |
| 2023/0169273 A1 | 6/2023 | Koneru |
| 2023/0230587 A1 | 7/2023 | Nguyen |
| 2023/0335125 A1 | 10/2023 | Velikovich |
| 2024/0039905 A1 | 2/2024 | Talavera |
| 2024/0176958 A1 | 5/2024 | Raimondo |
| 2024/0265269 A1 | 8/2024 | Chen |

(Continued)

*Primary Examiner* — Mark Villena
(74) *Attorney, Agent, or Firm* — Finnegan, Henderson, Farabow, Garrett & Dunner, LLP

(57) ABSTRACT

Methods, systems, apparatuses, and non-transitory computer-readable media are provided for providing answer data through multiple connected large language models. Operations may include receiving, through a graphical user interface associated with a local large language model having access to a first limited private dataset but not a second limited private dataset, an input from a user device, identifying, based on the input, an external large language model from among a plurality of external large language models, transmitting the input to the external large language model, receiving, from the external large language model, the answer data responsive to the input, generating, by the local large language model, response data based on the answer data, and outputting the response data at the user device.

22 Claims, 4 Drawing Sheets

(56) References Cited

U.S. PATENT DOCUMENTS

2024/0386041 A1    11/2024  Erickson
2024/0412000 A1*  12/2024  Mui ..................... G06F 16/953
2025/0140245 A1*   5/2025  Lee .................. G06F 16/90332

* cited by examiner

SYSTEMS AND METHODS FOR CONNECTED NATURAL LANGUAGE MODELS

CROSS REFERENCE TO RELATED APPLICATIONS

This application is a continuation of U.S. patent application Ser. No. 18/733,031, filed Jun. 4, 2024, the entire disclosure of which is incorporated herein by reference.

FIELD OF DISCLOSURE

The disclosed embodiments generally relate to systems, devices, methods, and computer-readable media for providing answer data through multiple connected large language models.

BACKGROUND

Large language models may be capable of receiving an input and generating an output based on the received input. For example, a large language model may receive a question as an input and generate an answer to the question as an output. Large language models may have access to large amounts of data, such as data from the internet. Such large language models may require large amounts of computational resources to generate answer data, which may result in inefficiencies in providing answer data based on received input, such as slow responses. Additionally, it may be desirable that certain types of data be inaccessible to certain users of the large language models. Further, conventional systems may generate false information (hallucinations) in response to a question, which may result in a user learning false information.

Therefore, to address these technical deficiencies in large language models, technical solutions for generating answer data through multiple connected large language models are desirable. For example, and as discussed further herein, disclosed embodiments may involve providing a local large language model with access to a first limited private dataset but not a second limited private dataset and an external large language model with access to the second limited private dataset but not the first limited private dataset. The local large language model may identify the external large language model and transmit user input from the local large language model to the external large language model. The large language model may then generate answer data in response to the user input received from the local large language model. The solutions provided by disclosed embodiments may allow a user device to have access to only a local large language model which may reduce the computational resources used or required by the user device. Further these solutions may allow for the segregation of datasets which may prevent a user of a local user device from accessing private datasets that may contain sensitive and secure data, while still providing accurate answer data, which may be based on the sensitive and secure data. Additionally, disclosed embodiments may allow for faster response times and reduced hallucinations from models. It is appreciated that these solutions address problems that arise in the realm of computer networks using language models.

SUMMARY

The disclosed embodiments describe a system for providing answer data through multiple connected large language models. For example, in an embodiment, the system may comprise at least one memory storing instructions and at least one processor configured to execute instructions to perform operations for providing answer data through multiple connected large language models. In an embodiment, the operations may comprise receiving, through a graphical user interface associated with a local large language model having access to a first limited private dataset but not a second limited private dataset, an input from a user device, identifying, based on the input, an external large language model from among a plurality of external large language models, wherein the external large language model may have access to the second limited private dataset but not the first limited private dataset and may be configured to output answer data interpretable by the local large language model, transmitting the input to the external large language model, receiving, from the external large language model, the answer data responsive to the input, generating, by the local large language model, response data based on the answer data, and outputting the response data at the user device.

According to a disclosed embodiment, identifying the external large language model may comprise identifying the external large language model based on one or more keywords in the input.

According to a disclosed embodiment, the external large language model may be prevented from accessing the internet.

According to a disclosed embodiment, identifying the external large language model may comprise identifying a content type of the input and matching the content type with the second limited private dataset corresponding to the external large language model.

According to a disclosed embodiment, the local large language model may have access to the internet.

According to a disclosed embodiment, the operations may further comprise transmitting the input from the external large language model to a second external large language model, wherein the second external large language model may have access to a third limited private dataset and receiving answer data associated with the input from the second external large language model.

According to a disclosed embodiment, the local large language model may not directly access the second external large language model.

According to a disclosed embodiment, a second user device may access the second external large language model.

According to a disclosed embodiment, the third limited private dataset may be larger than the second limited private dataset.

According to a disclosed embodiment, the second external large language model may have access to the second limited private dataset.

According to a disclosed embodiment, the second external large language model may not have access to the first limited private dataset.

According to a disclosed embodiment, the external large language model may not have access to the third limited private dataset.

According to a disclosed embodiment, the second external large language model may not have access to the internet.

The disclosed embodiments further describe a method for providing answer data through multiple connected large language models. For example, the method may comprise receiving, through a graphical user interface associated with a local large language model that may have access to a first limited private dataset but not a second limited private dataset, an input from a user device, identifying, based on the input, an external large language model from among a plurality of external large language models, wherein the external large language model may have access to the second limited private dataset but not the first limited private dataset and may be configured to output answer data interpretable by the local large language model, transmitting the input to the external large language model, receiving, from the external large language model, the answer data responsive to the input, generating, by the local large language model, response data based on the answer data, and outputting the response data at the user device.

According to a disclosed embodiment, a second user device may have access to the external large language model.

According to a disclosed embodiment, a permission level of the second user device may match a security level of the external large language model.

According to a disclosed embodiment, outputting the response data may comprise displaying the response data on the graphical user interface.

The disclosed embodiments also describe a non-transitory computer readable medium including instructions that may be executable by one or more processors to perform operations that may comprise receiving, through a graphical user interface associated with a local large language model that may have access to a first limited private dataset but not a second limited private dataset, an input from a user device, identifying, based on the input, an external large language model from among a plurality of external large language models, wherein the external large language model may have access to the second limited private dataset but not the first limited private dataset and may be configured to output answer data interpretable by the local large language model, transmitting the input to the external large language model, receiving, from the external large language model, the answer data responsive to the input, generating, by the local large language model, response data based on the answer data, and outputting the response data at the user device.

According to a disclosed embodiment, the operations may further comprise determining that at least one of the plurality of external large language models may be associated with the input and identifying the at least one of the plurality of external large language models based on the determination.

According to a disclosed embodiment, the first limited private dataset may comprise a data structure with multiple segments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
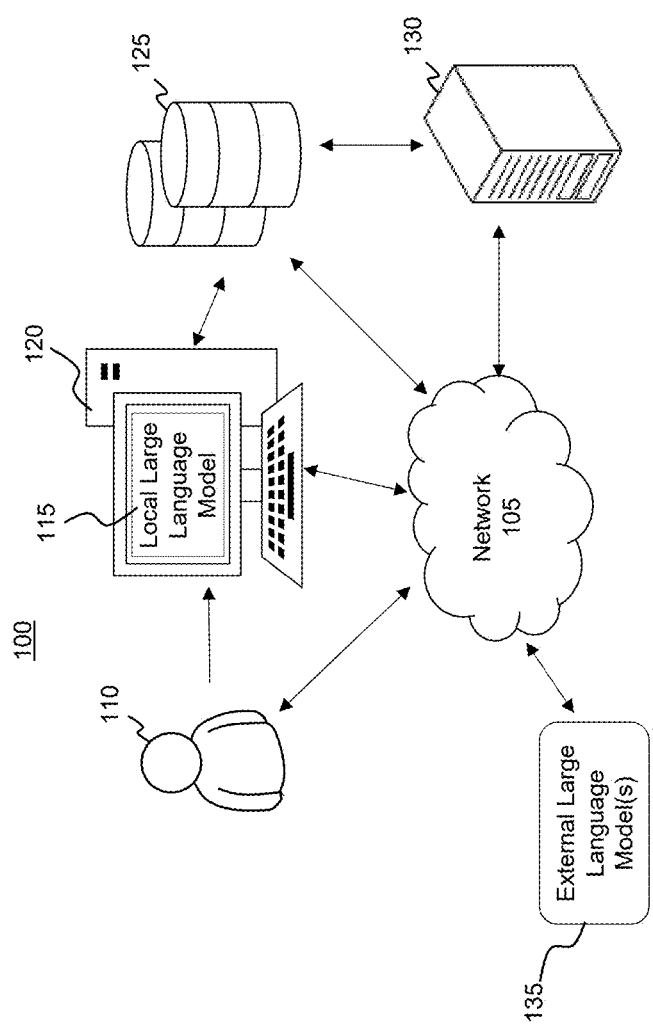
FIG. 1 is a block diagram of an exemplary system for providing answer data through multiple connected large language models, in accordance with disclosed embodiments.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized pre-loaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The techniques for providing answer data through multiple connected large language models may overcome technological problems related to providing relevant, useful, and targeted answer data to a user query. In particular, the disclosed embodiments provide techniques for generating answer data in response to a user query through the use of connected local and external large language models. As discussed above, a user, such as a student, may have specific questions related to information that may not be readily available on the internet (e.g., course scheduling information, class assignments, grade information, etc.). Existing techniques for generating prompts for a large language model may require that large amounts of data be stored locally on a user device, which may cause computational inefficiencies in the local user device. Further, allowing a large language model to access the internet may cause the large language model to generate false information in response to a question (hallucinations).

The disclosed embodiments provide technical solutions to these and other problems arising from current techniques. For example, various disclosed embodiments include a system for providing answer data through multiple connected large language models. The disclosed embodiments provide a system that separates large language models such that large datasets may not have to be stored on a local user device. Such disclosed embodiments may reduce the computational bandwidth required by the local user device by minimizing the storage requirements of the local user device. The disclosed embodiments further provide a system that may not allow certain large language models in the system to access the internet. Such disclosed embodiments may prevent model hallucinations. For example, various disclosed embodiments may provide a system including a local large language model that may have access to a first limited private dataset but not a second limited private dataset and a plurality of external large language models that may have access to a second limited private dataset but not a first limited private dataset. The local large language model may identify an external large language model from the plurality of external large language models based on user input to receive answer data responsive to the input.

Reference will now be made in detail to the disclosed embodiments, examples of which are illustrated in the accompanying drawings. It should be noted that while some embodiments may refer to students or teachers, all of the disclosed embodiments may be used in other contexts as well.

FIG. 1 illustrates a system 100 for providing answer data through multiple connected large language models, consistent with the disclosed embodiments. System 100 may include one or more users 110 operating one or more local large language models 115, one or more computing devices 120, one or more databases 125, one or more servers 130, and one or more external large language models 135, as shown in FIG. 1.

The various components of system 100 may communicate over a network 105, which may include at least one of the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or any electronic communication architecture. In some embodiments, the communications may take place across two or more of these forms of networks and their corresponding protocols. While system 100 is shown as a network-based environment, it is understood that the disclosed systems and methods may also be used in a localized system, with one or more of the components communicating directly with each other.

Computing devices 120 may be a variety of different types of computing devices capable of developing, storing, analyzing, and/or executing software code. For example, computing device 120 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 120 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 120 may operate using a Windows™ operating system, a terminal-based (e.g., Unix or Linux) operating system, a cloud-based operating system (e.g., through AWS™, Azure™, IBM Cloud™, etc.), or other types of non-terminal operating systems.

System 100 may further comprise one or more database(s) 125, which may store and/or execute software. For example, database 125 may be configured to store software or code, such as code developed using computing device 120. Database 125 may further be accessed by computing device 120, server 130, or other components of system 100 for downloading, receiving, processing, editing, or running the stored software or code. Database 125 may be any suitable combination of data storage devices, which may optionally include any type or combination of databases, load balancers, dummy servers, firewalls, back-up databases, and/or any other desired database components. In some embodiments, database 125 may be employed as a cloud service, such as a Software as a Service (SaaS) system, a Platform as a Service (PaaS), or Infrastructure as a Service (IaaS) system. For example, database 125 may be based on infrastructure or services of Amazon Web Services™ (AWS™), Microsoft Azure™, Google Cloud Platform™, Cisco Metapod™, Joyent™, vmWare™, or other cloud computing providers. Database 125 may be configured to use a data sharing platform, which may include other commercial file sharing services, such as Dropbox™, Google Docs™, or iCloud™. In some embodiments, database 125 may be a remote storage location, such as a network drive or server in communication with network 105. In other embodiments database 125 may also be a local storage device, such as local memory of one or more computing devices (e.g., computing device 120) in a distributed computing environment.

System 100 may also comprise one or more server device(s) 130 in communication with network 105. Server device 130 may manage the various components in system 100. In some embodiments, server device 130 may be configured to process and manage requests between computing devices 120 and/or databases 125. In embodiments where software code is developed within system 100, server device 130 may manage various stages of the development process, for example, by managing communications between computing devices 120 and databases 125 over network 105. Server device 130 may identify updates to code in database 125, may receive updates when new or revised code is entered in database 125, and may participate in providing answer data through multiple connected large language models as discussed below in connection with FIGS. 3-4.

System 100 may also comprise a local large language model 115 and one or more external large language models 135. Local large language model 115 may be accessible to user 110 through computing device 120 (e.g., by executing an application). Local large language model may be stored at computing device 120. Local large language model 115 may communicate with external large language models 135 through network 105. External large language models 135 may be stored at one or more databases 125 and/or one or more servers 130. Local large language model 115 and/or external large language models 135 may be any system, device, component, program, script, or the like, for receiving an input within system 100. Local large language model 115 and/or external large language models 135 may be a deep learning model capable of understanding and generating text, such as models which can generate a prediction of the next word in a phrase or sentence. For example, in some embodiments, local large language model 115 and/or external large language models 135 may comprise a large language model such as Amazon Bedrock™, GPT™, LLaMA™, Gemini™, Microsoft Copilot™, Google Bard™, Claude™, or any other type of model or computerized operation associated with a natural language. Local large language model 115 and/or external large language models 135 may be in any desired form, such as a statistical model (e.g., a word n-gram language model, an exponential language model, or a skip-gram language model) or a neural model (e.g., a recurrent neural network-based language model or an LLM). In some examples, local large language model 115 and/or external large language models 135 may include an LLM with artificial neural networks, transformers, encoders, decoders, other machine learning architectures, or any combination thereof. In some embodiments, local large language model 115 and/or external large language models 135 may include a trained language model. Local large language model 115 and/or external large language models 135 may be trained using, for example, supervised learning, self-supervised learning, semi-supervised learning, unsupervised learning, and/or reinforcement learning. In some examples, local large language model 115 and/or external large language models 135 may be pre-trained to generally understand a natural language, and the pre-trained language model may be fine-tuned for software development. For example, the pre-trained language model may be fine-tuned for software generation tasks based on training data of descriptions associated with software generation tasks, and the fine-tuned language model may be used to receive and process the identified software generation task. In some examples, local large language model 115 and/or external large language models 135 may include generative pre-trained transformers (GPT) or other types of generative artificial intelligence configured to generate human-like content (e.g., natural language).

Figure 2:
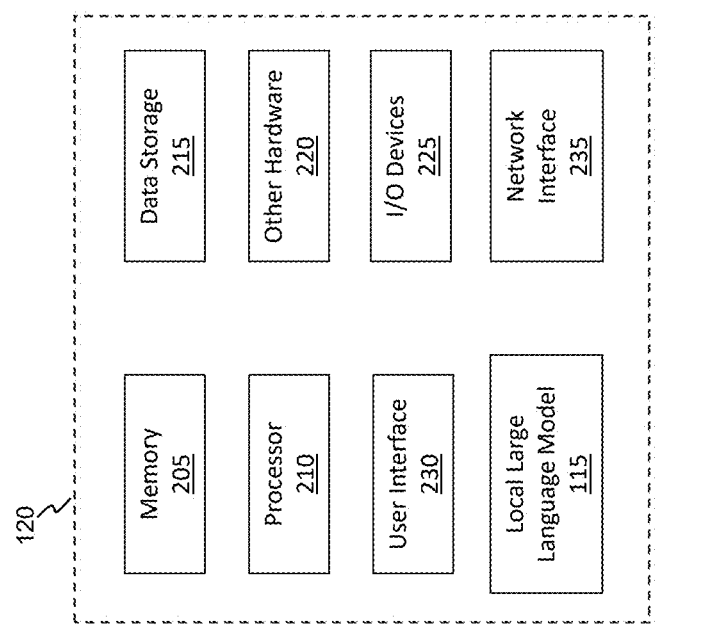
FIG. 2 is a block diagram of an exemplary computing device for providing answer data through multiple connected large language models, in accordance with disclosed embodiments.

FIG. 2 is a block diagram of an operating environment of a local large language model 115 implemented on computing device 120. As illustrated in FIG. 2, components of computing device 120 may include, but are not limited to, various hardware components, such as a system memory 205, one or more processors 210, data storage 215, other hardware 220, one or more I/O devices 225, a user interface 230, a network interface 235, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 120 may include at least one logical processor 210. The at least one logical processor 210 may include circuitry and transistors configured to execute instructions from memory (e.g., memory 205). For example, the at least one logical processor 210 may include one or more central processing units (CPUs), arithmetic logic units (ALUs), Floating Point Units (FPUs), and/or Graphics Processing Units (GPUs). A computing device 120, like other suitable devices, may also include one or more computer-readable storage media, which may include, but are not limited to, memory 205 and data storage 215. In some embodiments, memory 205 and data storage 215 may be part of a single memory component. The one or more computer-readable storage media may also be of different physical types. The media may be volatile memory, non-volatile memory, fixed in place media, removable media, magnetic media, optical media, solid-state media, and/or of other types of physical durable storage media (as opposed to merely a propagated signal). Some other examples of computer-readable storage media may include built-in random access memory (RAM), read-only memory (ROM), hard disks, and other memory storage devices which are not readily removable by users (e.g., memory 205).

The data storage 215 or system memory 205 may include computer storage media in the form of volatile and/or nonvolatile memory such as ROM and RAM. A basic input/output system (BIOS), containing routines that help to transfer information between elements within computing device 120, such as during start-up, may be stored in ROM. RAM may contain data and/or program modules that are immediately accessible to and/or presently being operated on by processing unit. By way of example, and not limitation, data storage 215 may hold an operating system, application programs, and other program modules and program data.

Data storage 215 may also include other removable/non-removable, volatile/nonvolatile computer storage media. By way of example only, data storage 215 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Although an embodiment may be described as being implemented as software instructions executed by one or more processors in a computing device (e.g., general-purpose computer, server, or cluster) or an extended reality device, such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 210, memory 205, data storage 215, and screens/displays, an operating environment may also include other hardware 220, such as batteries, buses, power supplies, wired and wireless network interface cards, for instance. In some embodiment, input/output devices 225 such as human user input/output devices (screen, keyboard, mouse, tablet, microphone, speaker, motion sensor, etc.) may be present in operable communication with one or more processors 210 and memory 205. A user such as user 110 may interact with the extended reality environment through computing device 120 by using one or more I/O device 225, such as a display, keyboard, mouse, microphone, touchpad, camera, sensor (e.g., touch sensor) and other devices, via typed text, touch, voice, movement, computer vision, gestures, and/or other forms of input/output.

Computing device 120 may further be configured to present at least one user interface 230, which may be stored in memory 205 and/or data storage 215, and/or may be generated by processor 210. A user interface 230 may support interaction between an embodiment and user 110. A user interface 230 may include one or more of a command line interface, a graphical user interface (GUI), natural user interface (NUI), voice command interface, and/or other user interface (UI) presentations, which may be presented as distinct options or may be integrated. A user may enter commands and information through a user interface 230 or other I/O devices 225 such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus but may be connected by other interface and bus structures, such as a parallel port, game port or a universal serial bus (USB). User interface 230 may include one or more toggles or controls which a user can interact with or operate.

Other computerized devices and/or systems not shown in FIG. 1 may interact in technological ways with computing device 120 or with another system using one or more connections to a network, such as network 105, via a network interface 235, which may include network interface equipment, such as a physical network interface controller (NIC) or a virtual network interface (VIF).

Figure 3:
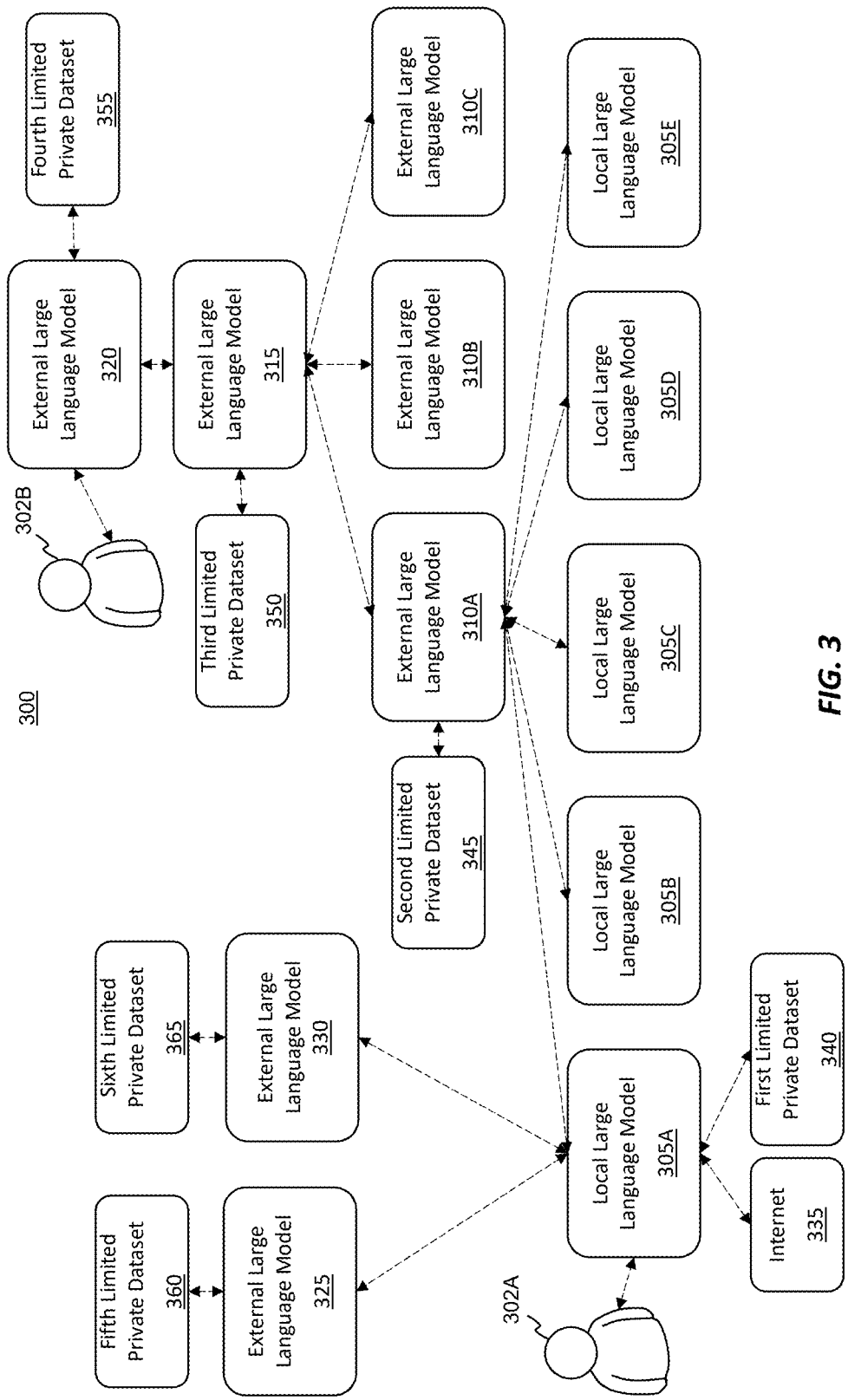
FIG. 3 is a block diagram of an exemplary system for providing answer data through multiple connected large language models, in accordance with disclosed embodiments.

FIG. 3 depicts a system 300 of multiple connected large language models, in accordance with disclosed embodiments. In some embodiments, a group of the multiple connected large language models may be organized and connected in a layered and/or hierarchical structure. For example, each of the multiple connected large language models may be arranged in "levels" and the level of the large language model may represent the type of data that the large language model may have access to. For example, large language models on the same level (e.g., local large language models 305A-305E, external large language model 310A-310C, etc.) may have access to the same or similar (e.g., similarly restricted) datasets, while large language models on a different level may have access to different datasets.

As depicted in FIG. 3, system 300 may include multiple local large language models 305A, 305B, 305C, 305D, and 305E (305A-305E). Local large language models 305A-305E may correspond to local large language model 115, as disclosed herein with respect to FIG. 1. User 302A may interact with a local large language model 305A (e.g., by entering an input or receiving answer data) through a computing device, such as computing device 120. Although not depicted in FIG. 3, each local large language model 305A-305E may be associated with a different user (e.g., each of local large language models 305A-305E may be accessible by a computing device of a different user). Each of local large language models 305A-305E may have access to a first limited private dataset associated with a user. For example, large language model 305A may have access to a first limited private dataset 340 associated with user 302A. The first limited private dataset 340 may comprise a data structure with multiple data segments. In some embodiments, the first limited private dataset 340 may include calendar or scheduling data, health data, contact information, an account or card number, a username, a password, or any personally identifiable information (PII). Segregating access to limited private datasets may improve device functioning by allowing for distributed processing of data, which may improve output speed and reduce computational load on individual devices. For example, because the local large language model 305A may only have access to first limited private dataset 340, computing device 120 of user 302A may conserve computing resources as less data may be held in the memory of computing device 120. Although FIG. 3 depicts five local large language models 305A-305E, system 300 may have any number of local large language models. Local large language model 305A may also have access to internet 335. In some embodiments, an input received from user 302A may be related to generalized information (e.g. "what is the weather," "where is this building," "when is Memorial Day?," etc.) and local large language model 305A may generate answer data in response to the input based on information accessible over internet 335. In other embodiments, as disclosed herein, the input received from user 302A may be related to specific, private information (e.g. "what is my grade in calculus," "when are the professor's office hours," "when is the history quiz?," etc.) and local large language model 305A may receive answer data from an external large language model to generate response data to the user input.

As depicted in FIG. 3, system 300 may include multiple external large language models 310A, 310B, and 310C (310A-310C). Each of local large language models 305A-305E may communicate with (e.g., transmit an input over network 105) external large language model 310A. Although not depicted in FIG. 3, a plurality of additional local large language models may communicate with external large language model 310B and external large language model 310C. External large language models 310A-310C may each have access to second limited private datasets 345. The second limited private datasets 345 may contain the same or similar data structures and data. For example, in some embodiments, a second limited private dataset 345 may include data related to an educational course, such as student grade data, data associated with a course textbook, a document (e.g., a word processing document), a file, a plan of study, scheduling data, course assignment data, or any other data related to a course. In some embodiments, each of external large language models 310A-310C may be associated with a section of a course. Each of external large language models 310A-310C may also not have access to the internet, which may reduce model hallucination. Local large language models 305A-305E may not have access to the second limited private dataset 345 of external large language model 310A and external large language model 310A may not have access to the first limited private datasets 340 of local large language models 305A-305E, which can improve accuracy and usefulness of model output, such as by reducing model hallucination. Local large language model 305A may send an input over network 105 from user 302A (e.g., a computing device 120 associated with user 302A) to external large language model 310A when the input from user 302A is related to the second limited private dataset 345 of external large language model 310A. Preventing local large language model 305A from accessing the second limited private dataset 345 of external large language model 310A may prevent local large language model 305A from accessing secure and sensitive data that may be stored in the second limited private dataset 345, while still allowing local large language model 305A to generate accurate and useful model output. Accordingly, this may increase the security of data stored in system 300, a problem that often arises in the realm of computer networks. Although FIG. 3 depicts three external large language models 310A-310C, system 300 may include any number of external large language models at the same level as external large language models 310A-310C.

As depicted in FIG. 3, system 300 may include an external large language model 315. External large language model 315 may have access to a third limited private dataset 350, which may not be accessible to external large language models 310A-310C or to local large language models 305A-305E. External large language models 310A-310C may communicate with (e.g., transmit an input over network 105) external large language model 315. Local large language models 305A-305E may be prevented from communicating directly with external large language model 315. The third limited private dataset 350 may comprise a data structure with multiple data segments. In some embodiments, the third limited private dataset 350 may comprise data associated with an educational course, such as course section scheduling data, student grade data for a plurality of course sections, or any additional course data. External large language model 315 may be prevented from accessing the internet, which may reduce model hallucinations. Although FIG. 3 depicts one external large language model 315, system 300 may include any number of external large language models at the same level as external large language model 315.

As depicted in FIG. 3, system 300 may also include an external large language model 320. User 302B may interact with external large language model 320 (e.g., by entering an input or receiving answer data) through a computing device, such as computing device 120. External large language model 320 may have access to a fourth limited private dataset 355 which may not be accessible to external large language model 315, external large language models 310A-310C, or local large language models 305A-305E. External large language model 315 may communicate with (e.g., transmit an input over network 105) external large language model 320. External large language models 310A-310C and local large language models 305A-305E may be prevented from communicating directly with external large language model 320. The fourth limited private dataset 355 may comprise a data structure with multiple segments of data associated with user 302B. In an example embodiment, user 302B may be a professor or teacher of an educational course, or any user who may have different privileges from a user 302A. In such an embodiment, user 302B may interact with external large language model 320 to receive answer data related to the course.

As depicted in FIG. 3, local large language model 305A may also communicate with (e.g., transmit an input over network 105) external large language model 325 and external large language model 330. External large language model 325 and external large language model 330 may not be associated with the layered structure of external large language models 310A-310C, 315, and 320. For example, external large language models 310A-310C, 315, and 320 may have access to a plurality of related limited private datasets, as disclosed herein, that may be related to the same topic, such as an educational course. External large language model 325 may have access to a fifth limited private dataset 360 and external large language model 330 may have access to a sixth limited private dataset 365 that may be unrelated to the topic (e.g., the educational course). For example, the fifth limited private dataset 360 and the sixth limited private dataset 365 may be associated with an information technology help desk, a registrar, a guidance counseling office, a library, a health center, or any other datasets. Local large language model 305A may not have access to the fifth limited private dataset 360 and the sixth limited private dataset 365. Preventing local large language model 305A from accessing the fifth limited private dataset 360 and the sixth limited private dataset 365 may ensure that local large language model 305A may not access secure and sensitive data stored in the fifth limited private dataset 360 and the sixth limited private dataset 365. Further, segregating access to the limited private datasets between models may allow for distributed processing of the data, which may improve output speed and reduce computational load on individual devices. Local large language model 305A may communicate with external large language model 325 and external large language model 330 to generate and/or provide answer data associated with (e.g., in response to, based on, dependent on, and/or using) an input from user 302A. Although FIG. 3 depicts two external large language models 325, 330, system 300 may include any number of external large language models outside the layered structure of external large language models.

Figure 4:
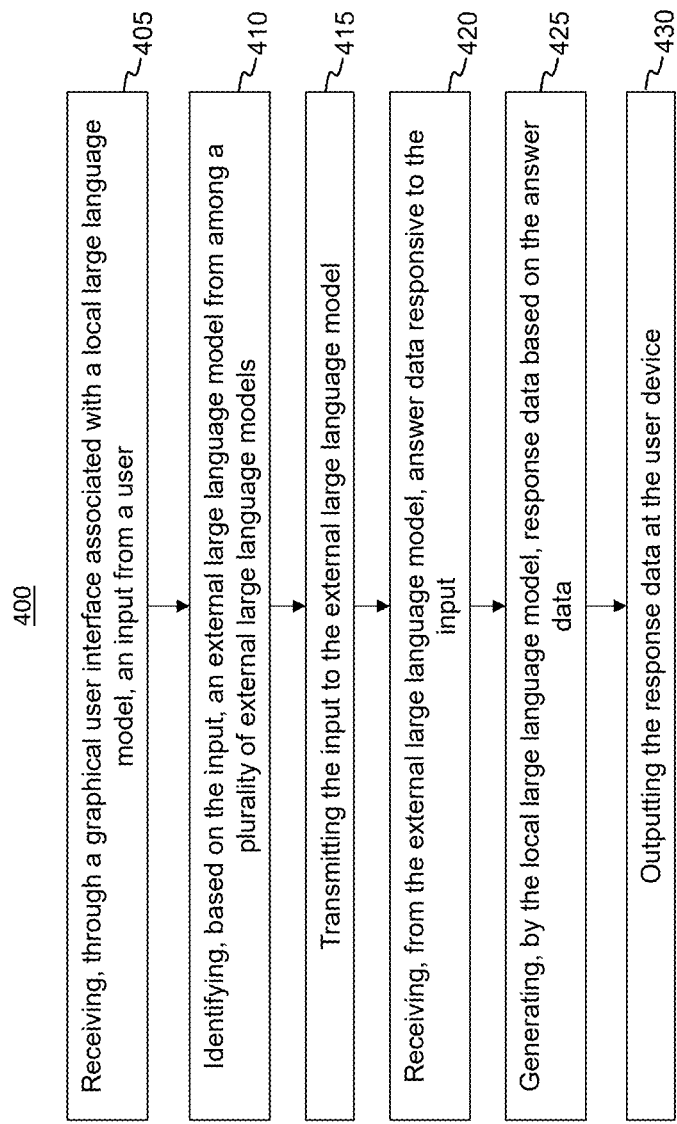
FIG. 4 is a flowchart of an exemplary process for providing answer data through multiple connected large language models, in accordance with disclosed embodiments.

FIG. 4 depicts a process 400 for providing answer data through multiple connected large language models. In accordance with disclosed embodiments, process 400 may be implemented through computing device 120 depicted in FIG. 1, or any other component of system 100. In some embodiments, different parts of process 400 may be performed by different devices. For example, parts of process 400 may be performed by a user associated with a computing device 120, and other parts may be performed by a server 130 or other computing device 120, which may implement a model, such as an external large language model 135. Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Step 405 of process 400 may include receiving an input from a user, such as user 302A. User 302A may provide an input verbally, through a text input, or through any other medium appropriate for providing an input. Process 400 may translate a verbal query into a text representation through speech recognition, such as through a speech-to-text model. User 302A may provide an input through a graphical user interface associated with a local large language model. For example, user 302A may provide an input through a graphical user interface displayed on a computing device, such as computing device 120, by using an I/O device, such as I/O devices 225. An input may include or be associated with a question (e.g., "how much of my grade has been determined already?", "when is our next test for my calculus class?", "when will my assignment be graded?", "which class presentation talks about quantum mechanics?"). The local large language model may correspond to local large language model 305A, as disclosed herein with respect to FIG. 3. The local large language model may have access to a first limited private dataset but may not have access to a second limited private dataset. In some embodiments, the first limited private dataset may comprise a data structure with multiple data segments. The first limited private dataset may include data related to user 302A. In some embodiments, the local large language model may have access to the internet.

Step 410 of process 400 may include identifying, based on the input, an external large language model from among a plurality of external large language models. The external large language model may have access to the second limited private dataset but may not have access to the first limited private dataset. In some embodiments, the external large language model may be prevented from accessing the internet. Preventing the external large language model from accessing the internet may limit model hallucinations. In some embodiments, the external large language model may correspond to external large language model 310A. In such an embodiment, the external large language model may be part of a layered (e.g., hierarchical) structure of large language models. In other embodiments, the external large language model may correspond to external large language model 325 or external large language model 330. In such an embodiment, the external large language model may not be a part of a layered (e.g., hierarchical) structure of large language models. The external large language model may be configured to output answer data that may be interpretable by the local large language model. For example, the external large language model may be configured to output answer in a non-human readable language that may be interpretable by the local large language model.

In some embodiments, the external large language model may be accessible by a second user through a second user device (e.g., a second computing device 120). The second user may comprise an administrative user (e.g., a professor of a course). To access the external large language model, the second user may need to provide credentials, such as a username and password. The credentials may correspond to a permission level of the second user device. The permission level of the second user device may need to match a security level of the external large language model. For example, the second user device may have an administrative permission level which may allow the second user device to access the external large language model. Preventing users without the proper permission levels from accessing the external large language model may protect the security of data associated with the external large language model. For example, the second limited private dataset accessible by the external large language model may have secure or sensitive data. Allowing the second user device to access the external large language model when the permission level of the second user device matches the security level of the external large language model may enforce the security of the second limited private dataset.

Identifying the external large language model may comprise identifying the external large language model based on one or more keywords in the input. As disclosed herein with respect to FIG. 3, each of the external large language models from the plurality of external large language models may have access to separate, distinct limited private datasets. In some embodiments, a local large language model may be used to identify the external large language model. For example, the local large language model may use a keyword from the user input to identify which external large language model from the plurality of external large language models may have access to a limited private dataset that may be able to provide answer data in response to the user input. In some embodiments, matching of words may include using a digital map, such as a word map or landscape, semantic map, topical map, or any structured (e.g., quantified) relevance representation of closeness in relevance between words, which may be based on the limited private datasets of the external large language models. In some embodiments, a digital map may include hundreds, thousands, or millions of words, phrases, topics, and connections and/or relationships between them, and it is appreciated that the digital map would be impractical if not impossible for a human to use (and in fact may be represented or written using computer-based language or syntax that is foreign to human language). In some embodiments, a word-to-word match may be considered a "match." Optionally, a "match" may not include an exact word-to-word match. For example, a synonym or a word within a threshold distance according to a relevance representation may comprise a "match."

In other embodiments, identifying the external large language model from the plurality of external large language models may comprise identifying a content type of the input and matching the content type with the second limited private dataset corresponding to the external large language model. A content type may include content related to an academic subject (e.g., history, science, calculus, etc.), content related to student health, content related to technology, content related to course registration, or any other defined category of a user input. Identifying a content type of the input may comprise identifying a topic that the input is associated with. For example, the content type of the input may be a topic associated with a particular educational course, a topic related to a student health center, a topic related to an information technology help desk, a topic related to course registration, among other content types. The local large language model may match the content type of the input with the external large language model associated with a second limited private dataset. For example, the local large language model may determine that the external large language model associated with the second limited private dataset may have access to data associated with (e.g., corresponding to) the content type of (e.g., identified by, derivable from) the user input.

Step 415 of process 400 may include transmitting the input to the external large language model. Transmitting the input to the external large language model may refer to transmitting, transferring, decrypting, making accessible, and/or providing (e.g., across a network, such as network 105) data or information. For example, transmitting the input to the external large language model may comprise providing the input as an input to the external large language model. In some embodiments, the local large language model may identify the external large language model and transmit the user input to the external large language model automatically and without any additional prompting or input from user 302A. Optionally, the local large language model may transmit additional digital information with the input to the external large language model, such as an identifier (e.g., course code), a date, an individual's name, which may be derived by the local large language model from data accessible to it, and which may improve model output from, or operations performed by, the external large language model. For example, the local large language model may transmit part of a private data set (e.g., a private schedule) to the external large language model. Additionally or alternatively, the local large language model may transmit information derived from public data (e.g., weather information, traffic information, an individual's name, a location, a location name, academic subject information) to the external large language model. In some embodiments, the local large language model may combine the input with additional digital information into a prompt interpretable by the external large language model. The external large language model may be able to determine and/or generate answer data based on the input and/or additional digital information.

Step 420 of process 400 may include receiving, from the external large language model, the answer data responsive to (e.g., based on, generated using, dependent on, and/or associated with) the input. Answer data may comprise information identified by the external large language model as responding to the input received from the local large language model. The local large language model may receive the answer data over network 105. The answer data received from the large language model may be in a format that may be interpretable by the local large language model, for example in a machine language that may not be human-readable. It is appreciated that in embodiments where the user input and the answer data are transmitted between the local large language model and the external large language model in a machine language, providing answer data through connected large language models may occur using operations unperformable by a human user.

Step 425 of process 400 may include generating, by the local large language model, response data based on the answer data. The local large language model may adjust, enhance, or optimize the answer data so that the response data may be presented in a suitable manner for answering the user input. For example, the local large language model may receive the answer data in a non-human readable format and may translate the answer data into a natural language format. The local large language model may further alter, rephrase, or reorganize the answer data so that the response data may be presented in a more suitable manner for answering the user input. Additionally or alternatively, the local large language model may transmit one or more requests to the external large language model (e.g., based on one or more responses received from the external large language model) for additional output usable to enhance the response data, which may occur without additional input from the user.

Step 430 of process 400 may include outputting the response data at the first user device. Outputting the response data may comprise displaying the response data through the graphical user interface associated with the local large language model in a natural language format. In some embodiments, the response data may be output in a text display, through an audio recording, or through any other manner suitable for outputting the response data.

In some embodiments, process 400 may further comprise transmitting the input from the external large language model to a second external large language model and receiving answer data associated with the input from the second external large language model. The second external large language model may correspond to external large language model 310A, as disclosed herein with respect to FIG. 3. The second external large language model may have access to a third limited private dataset. The third limited private dataset may comprise a data structure with multiple data segments. The external large language model may determine that the second limited private dataset does not have answer data suitable for answering the user input. The external large language model may automatically, without additional prompting or input from the user, transmit the input to the second external large language model, which the local large language model may be unable to communicate with directly. Transmitting the input to the second external large language model may refer to transmitting, transferring, or providing (e.g., across a network, such as network 105) data or information. The second external large language model may generate answer data based on the input. The second external large language model may transmit (e.g., over network 105) the answer data to the external large language model. The external large language model may receive the answer data associated with the input and may transmit the answer data to the local large language model.

The second external large language model may be related to the external large language model through a dependent, interdependent, hierarchical, or other type of relationship. For example, the local large language model may not be able to directly access (e.g., communicate with) the second external large language model. The local large language model may provide an input to the external large language model but may not be able to provide an input to the second external large language model. The second external large language model may only be accessed through the external large language model when the external large language model has determined that the second limited private dataset does not include data sufficient to answer the user input. Further, the second external large language model may not have access to the first limited private dataset associated with the local large language model. In some embodiments, the third limited private dataset may be larger than the second limited private dataset. For example, the third limited private dataset may contain data found in the second limited private dataset and may also contain additional data related to other sources. In some embodiments, the second external large language model may have access to the second limited private dataset associated with the external large language model, however the external large language model may not have access to the third limited private dataset associated with the second external large language model. In a non-limiting example, the second limited private dataset may correspond to a section of an educational course while the third limited private dataset may correspond to an entire educational course, including multiple sections of the educational course. In some embodiments, the second external large language model may not have access to the internet. Preventing the second external large language model from accessing the internet may reduce model hallucination and may prevent the second external large language model from generating false information in response to the input. In some embodiments, a second user device may access the second external large language model. The second user device may access the second external large language model through a graphical user interface associated with the second external large language model displayed on the second user device.

In some embodiments, process 400 may further comprise determining that at least one of the plurality of external large language models is associated with the input and identifying the at least one of the plurality of external large language models based on the determination. The local large language model may have access to a first limited private dataset and may also have access to the internet. The local large language model may receive an input from the user and may determine that suitable answer data in response to the input may not be generated based on the first limited private dataset or the internet. Accordingly, the local large language model may determine to communicate with an external large language model which may generate suitable answer data based on a second limited private dataset accessible to the external large language model. The local large language model may then identify the external large language model after determining that the external large language may be associated with the input and may generate suitable answer data in response to the input.

As used herein, unless specifically stated otherwise, being "based on" may include being dependent on, being derived from, being associated with, being influenced by, or being responsive to. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system comprising:
   at least one memory storing instructions;
   at least one processor configured to execute instructions to perform operations for providing answer data through multiple connected language models, the operations comprising:
      receiving, through a graphical user interface associated with a program having access to a first limited private dataset but not a second limited private dataset or a third limited private dataset, an input from a first user device;
      transmitting, to a first external language model of a plurality of language models comprising a second external language model, the input and digital information derived using the first limited private dataset, wherein:

the first external language model has access to the second limited private dataset but not the first limited private dataset or the third limited private dataset;

the first external language model is configured to output answer data interpretable by the program; and the second external language model has access to the third limited private dataset but not the first limited private dataset or the second limited private dataset;

receiving, from the first external language model, the answer data responsive to the input and the digital information;

generating, by the program, response data based on the answer data received from the first external language model; and outputting the response data at the first user device.

2. The system of claim 1, wherein the graphical user interface facilitates an interaction between a first user and the program.

3. The system of claim 1, wherein the first limited private dataset is associated with a first user.

4. The system of claim 1, wherein the input comprises a question.

5. The system of claim 1, wherein:
the input comprises a verbal query; and
the operations further comprise translating the verbal query into a text representation using speech recognition.

6. The system of claim 1, wherein:
the input is associated with a content type comprising at least one of an academic subject, health, technology, or course registration; and
the second limited private dataset, accessible by the first external language model but not the program or the second external language model, includes data associated with the content type.

7. The system of claim 1, wherein the program cannot directly access the second external language model.

8. The system of claim 1, wherein at least one of the first external language model or the second external language model is accessible by a second user device.

9. The system of claim 8, wherein:
the first user device has a first set of privileges and the second user device has a second set of privileges; and
the second set of privileges corresponds to a security level of at least one of the first external language model or the second external language model.

10. The system of claim 9, wherein at least one of the first external language model or the second external language model is configured to receive an input from the second user device.

11. The system of claim 1, wherein at least two of the plurality of language models have access to a same dataset.

12. The system of claim 1, wherein at least one of the first external language model or the second external language model does not have access to the internet.

13. The system of claim 1, wherein the first user device does not have access to the second external language model.

14. The system of claim 1, wherein the first external language model is configured to transmit the input to the second external language model.

15. The system of claim 1, further comprising identifying, based on the input, the first external language model, prior to transmitting the input to the first external language model.

16. The system of claim 1, wherein the answer data is altered by a local language model to generate the response data.

17. A method for providing answer data through multiple connected language models, the method comprising:
receiving, through a graphical user interface associated with a program having access to a first limited private dataset but not a second limited private dataset or a third limited private dataset, an input from a first user device;

transmitting, to a first external language model of a plurality of language models comprising a second external language model, the input and digital information derived using the first limited private dataset, wherein:
the first external language model has access to the second limited private dataset but not the first limited private dataset or the third limited private dataset;
the first external language model is configured to output answer data interpretable by the program; and
the second external language model has access to the third limited private dataset but not the first limited private dataset or the second limited private dataset;

receiving, from the first external language model, the answer data responsive to the input and the digital information;

generating, by the program, response data based on the answer data received from the first external language model; and outputting the response data at the first user device.

18. The method of claim 17, wherein the second limited private dataset includes data related to an educational course.

19. The method of claim 18, wherein the data related to the educational course comprises at least one of: student grade data, data associated with a textbook, a document, a file, a plan of study, scheduling data, or course assignment data.

20. A non-transitory computer readable medium including instructions that are executable by one or more hardware processors to perform operations for providing answer data through multiple connected language models, the operations comprising:
receiving, through a graphical user interface associated with a program having access to a first limited private dataset but not a second limited private dataset or a third limited private dataset, an input from a first user device;

transmitting, to a first external language model of a plurality of language models comprising a second external language model, the input and digital information derived using the first limited private dataset, wherein:
the first external language model has access to the second limited private dataset but not the first limited private dataset or the third limited private dataset;
the first external language model is configured to output answer data interpretable by the program; and
the second external language model has access to the third limited private dataset but not the first limited private dataset or the second limited private dataset;

receiving, from the first external language model, the answer data responsive to the input and the digital information;

generating, by the program, response data based on the answer data received from the first external language model; and outputting the response data at the first user device.

21. The non-transitory computer readable medium of claim 20, wherein the operations further comprise identifying the first external language model from among the plurality of external language models by using at least one keyword in the input to determine that the second limited private dataset associated with the first external language model contains answer data associated with the input.

22. The non-transitory computer readable medium of claim 20, wherein the program has access to the internet.

\* \* \* \* \*